(No Model.) 2 Sheets—Sheet 1.

G. W. KIRKPATRICK.
SEEDING MACHINE.

No. 359,727. Patented Mar. 22, 1887.

Attest:
Sidney P. Hollingsworth
W. R. Kennedy

Inventor:
Geo. W. Kirkpatrick
By his Atty
Phil. T. Dodge (No Model.) 2 Sheets—Sheet 2.
G. W. KIRKPATRICK.
SEEDING MACHINE.
No. 359,727. Patented Mar. 22, 1887.
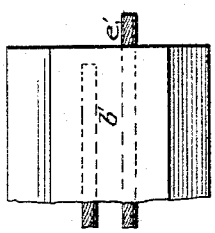
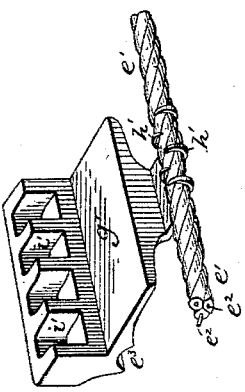
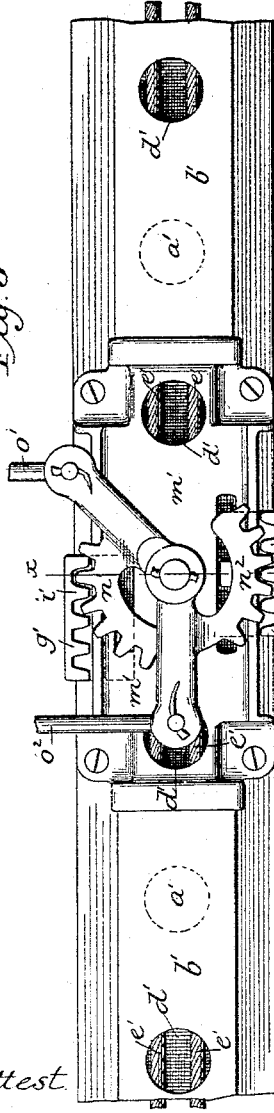
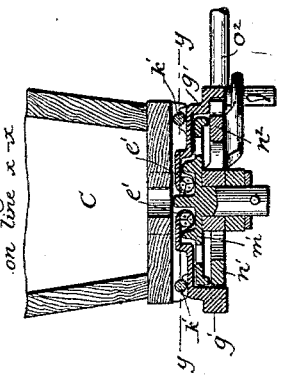
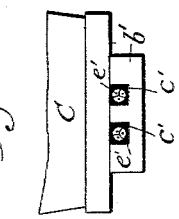
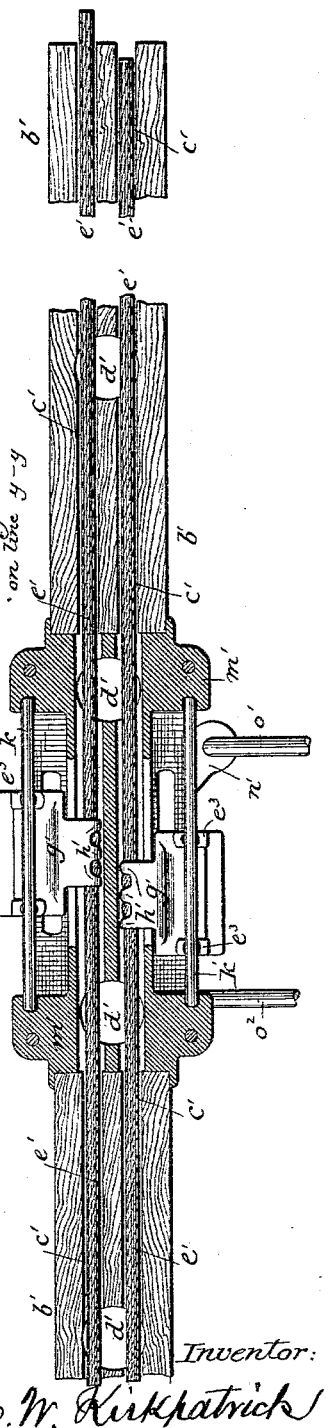
Attest
Sidney P. Hollingsworth
W. R. Kennedy
Inventor:
Geo. W. Kirkpatrick
By his Atty
Phil. T. Dodge.
N. PETERS, Photo-Lithographer, Washington, D. C.

UNITED STATES PATENT OFFICE.

GEORGE WILSON KIRKPATRICK, OF MACEDON, NEW YORK.

SEEDING-MACHINE.

SPECIFICATION forming part of Letters Patent No. 359,727, dated March 22, 1887.

Application filed January 5, 1887. Serial No. 223,419. (No model.)

*To all whom it may concern:*

Be it known that I, GEORGE WILSON KIRKPATRICK, of Macedon, in the county of Wayne and State of New York, have invented certain Improvements in Seeding-Machines, of which the following is a specification.

This invention relates more particularly to machines for distributing grain and grass-seed broadcast, although certain of the improvements, as will hereinafter appear, are applicable to grain-drills.

The first part of my invention relates more especially to that class of walking-machines in which the seed-hopper and seed-distributing mechanisms are mounted on a frame or barrow supported at one end by a ground-wheel and provided at the other with handles, that it may be conveniently trundled by the operator.

The second part of the invention relates to the devices for discharging or distributing the seed; and it consists in various improvements upon the mechanism for which Letters Patent of the United States were issued to me on the 18th day of May, 1886, No. 342,209.

Figure 1:
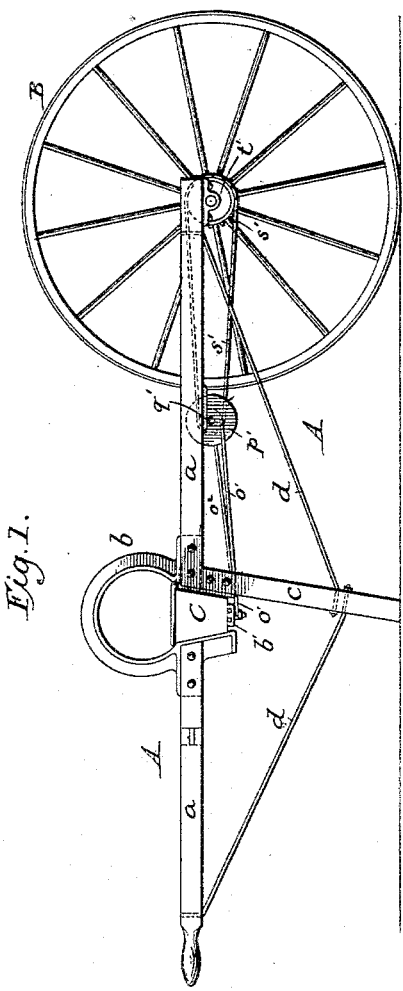
Figure 2:
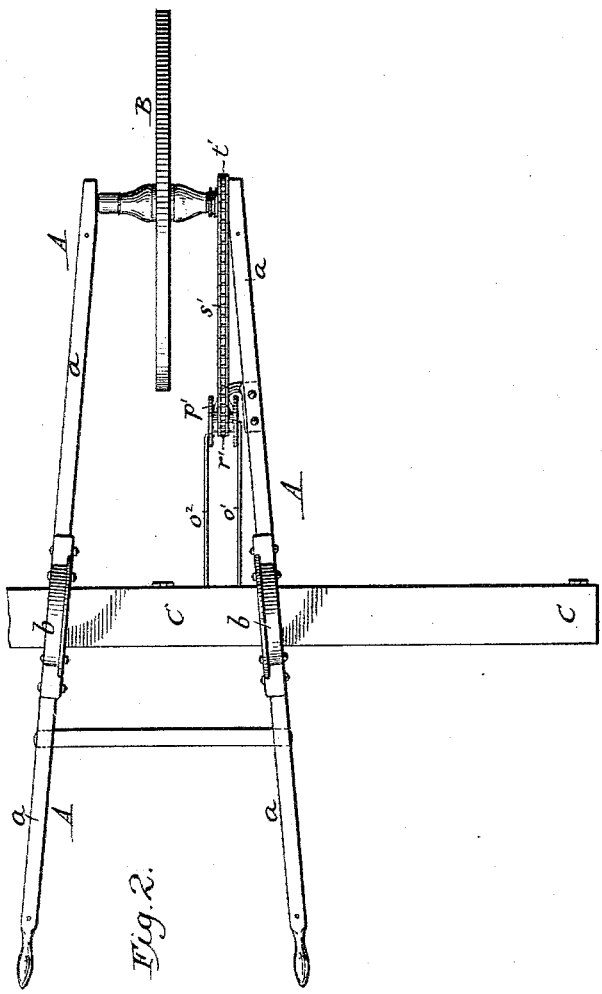

In the accompanying drawings, Figure 1 represents a side elevation of my improved machine. Fig. 2 is a top plan view of the same. Fig. 3 is a bottom plan view of the hopper. Fig. 4 is an end view of the hopper-bottom. Fig. 5 is a cross-section of the same on the line $x\,x$. Fig. 6 is a horizontal section of the same on the line $y\,y$. Fig. 7 is a perspective view of one of the distributer-cords and its operating-plate.

Referring more particularly to Figs. 1 and 2 of the drawings, A represents the main frame, B the main wheel, and C the seed box or hopper carried by and lying transversely across the frame. The frame consists, essentially, of two side bars, $a$, connected by suitable cross-bars, the side bars converging toward their forward ends, their rear ends being fashioned into handles, and their forward ends being supported by the journals of the wheel B. Heretofore it has been customary to form each side-bar in a continuous piece from end to end. For the purpose of suitably supporting the hopper, I depart from this construction by dividing each side bar midway of its length, or thereabout, and connecting its two parts by an intermediate casting, $b$, of a substantially $\Pi$-form, having its lower end flanged and bolted firmly to the adjacent ends of the side bar. This casting, which may be modified somewhat in its form, serves to connect the two parts of the side bar rigidly with each other, leaving, however, between their ends a space to receive the lower part of the seed-box, over which the casting passes, as shown in Fig. 1. The inner walls of the casting converge toward their lower ends, and are adapted to fit snugly against and give firm support to the walls of the hopper. This hopper, which is made, as usual, of a length of ten feet, (more or less,) is inserted endwise through the castings and dropped to its place between their lower extremities. By thus dividing the side bars, $a$, and connecting their two parts by a casting passing over the seed-box, I am enabled to properly support the latter without weakening the frame, and to leave the under side of the box exposed throughout its entire length, so that the seed may fall to the ground without interference. The construction is also advantageous in that it permits the instantaneous removal of the hopper to reduce the size of the machine when it is to be stored or transported, and in that it delivers the seed near the ground, so that it is not scattered by wind.

The main frame is provided, as usual, with two downwardly-extending legs, $c$, which, bearing upon the ground, support the machine in position when it is not in use. In order to give additional strength to the frame, I propose to extend truss-rods $d$ from the respective legs to opposite ends of the side bars, as shown in the drawings; but it is to be distinctly understood that these rods are not a necessary feature of my construction.

I propose to use in connection with the seed-box seed-distributing mechanism of any appropriate character; but I recommend as that best adapted to the purpose the peculiar devices which I will now describe, referring particularly to Figs. 3 to 7.

The hopper-bottom is provided at regular intervals with vertical openings $a'$, through which the seed descends therefrom. To the under side of the hopper, directly beneath these openings, is secured a board or bar, $b'$, extending its entire length, and provided in the upper surface next to the hopper-bottom with two parallel grooves, $c'$, into which the seed passes from the hopper, and from which it escapes through openings $d'$, extending downward through the bar. The openings $a'$ and $d'$ are located out of line with each other. For the purpose of carrying the seed constantly and uniformly from the openings $a'$ to the delivery-openings $d'$, I mount in each of the grooves $c'$ a reciprocating distributer, $e'$, consisting of a rope or cord stiffened by means of metallic wires or strands $e^2$, incorporated therein, as shown in Fig. 7. Distributer-cords have been heretofore employed in machines of the present class; but being limp or flexible they required to be used in connection with reciprocating frames, in which they were supported. These frames, which were, for many reasons, objectionable, are dispensed with under my construction, the stiffness of my cord permitting it to be reciprocated by devices acting thereon at a single point in their length. These stiffened cords may be operated by devices of any appropriate character; but I prefer to make use of two reciprocating plates, $g'$, constructed of malleable iron, and each having a series of fingers, $h'$, which are compressed tightly around the adjacent cord, and a series of cogged teeth, $i'$. Each plate is grooved on its upper surface, as shown at $e^3$, to receive a guide-rod, $k'$, on which it slides. These guide-rods are secured in position against the hopper-bottom by ears on a plate, $m'$, the body of which underlies and supports the plates $g'$, and which are screwed rigidly to the hopper. Two sector-racks, $n'$ and $n^2$, are mounted on a stud on the under side of the plate $m'$, and engage the teeth of the respective plates $g'$, serving to reciprocate said plates and the cords $e'$ connected thereto. The sector-plates $n'$ and $n^2$ are preferably actuated by pitmen $o'$ and $o^2$, attached eccentrically to revolving disks $p'$ on opposite ends of a shaft, $q'$, mounted in a bearing on the main frame. This shaft carries a central pulley, $r'$, actuated by a belt or chain, $s'$, from a pulley, $t'$, connected by a clutch, or otherwise, to the hub of the main wheel.

The two pitmen are connected to the driving-wheels in such position that they pass the center at different times. This causes each of the cords $e'$ to reverse its movement while the other is in motion, so that one or the other of the cords is always acting to deliver seed. In this manner I am enabled to secure a continuous delivery of the seed, and to avoid the intermitting action of the distributer, which would occur if the two cords changed the direction of their movement at the same instant.

It will be observed that I am able to operate the stiffened cords solely by means of the plates $g'$, and without having any connections or attachments whatever at their ends. While I prefer, for various reasons, to employ cord or rope with the metallic strands therein, it is to be understood that I may substitute for said cord wooden or other rigid bars having their outer surfaces suitably roughened or fluted to carry the seed.

While I have secured and prefer to employ two cords, it will be manifest that a single cord, stiffened as described, may be used.

I am aware that a smooth wire or rod having a rubber tube drawn thereon has been proposed for a feeder, and this I do not claim. By my construction I retain all the advantages of the cord with its soft uneven surface to deliver the seed regularly and without cutting the same, and at the same time do away with the usual frame for keeping the cord under tension.

I am aware that metallic strands have been incorporated in ropes and cables for the purpose of increasing their strength, and therefore I do not claim, broadly, such combination.

Having thus described my invention, what I claim is—

1. In a frame for a walking-seeder, the side bars each divided transversely and having its two parts connected by an arched plate or casting, substantially as described.

2. The seeder-frame consisting of the supporting-wheel, the side bars, $a$, each divided midway of its length, and the plates or castings $b$, secured to and connecting the two parts of the side bars, substantially as described.

3. In a seeder-frame, the combination of the divided side bars, $a$, their arched connecting-plates $b$, the legs $c$, and truss-rods $d$.

4. In a side bar, two longitudinal frame-bars, each divided and having its two parts rigidly connected by an arched plate or casting, in combination with a seed box or hopper extending through said plates, substantially as described.

5. In a seeder, and in combination with a hopper having a feeding groove or channel, a feeding-cord mounted in said groove and stiffened internally by wire, and the reciprocating operating device engaging said cord at a point between its ends, whereby the advantages of the soft and irregular surface of the cord are rendered available without the use of the usual means for keeping the same under tension.

6. The hopper and the reciprocating device thereunder, in combination with the rack-plates attached to said cord, the guide-rods for said plates, and the plate $m'$, supporting the rack-plates and rods, substantially as described.

7. In combination with a feeding-cord, the actuating-plate having the fingers to embrace said cord, substantially as described.

In testimony whereof I hereunto set my hand, this 10th day of December, 1886, in the presence of two attesting witnesses.

GEORGE WILSON KIRKPATRICK.

Witnesses:
WASHINGTON LAFAYETTE ACKER,
HENRY HOBART REED.